United States Patent [19]

Shuey

[11] Patent Number: 4,890,089
[45] Date of Patent: Dec. 26, 1989

[54] DISTRIBUTION OF LINE CARRIER COMMUNICATIONS

[75] Inventor: Kenneth C. Shuey, Raleigh, N.C.

[73] Assignee: Westinghouse Electric Corp., Pittsburgh, Pa.

[21] Appl. No.: 275,843

[22] Filed: Nov. 25, 1988

[51] Int. Cl.[4] .............................................. H04B 3/56
[52] U.S. Cl. ............................................... 340/310 A
[58] Field of Search ......... 340/310 A, 310 R, 310 CP

[56] References Cited

U.S. PATENT DOCUMENTS

| 4,408,186 | 10/1983 | Howell | 340/310 A |
| 4,442,364 | 4/1984 | Dey | 340/310 A X |
| 4,556,864 | 12/1985 | Roy | 340/310 A |
| 4,636,771 | 1/1987 | Ochs | 340/310 A X |
| 4,668,934 | 5/1987 | Shuey | 340/310 A |
| 4,766,414 | 8/1988 | Shuey | 340/310 A |

Primary Examiner—John Chapman
Assistant Examiner—Joseph W. Roskos
Attorney, Agent, or Firm—B. R. Studebaker

[57] ABSTRACT

Apparatus for coupling a high voltage power distribution system (2) to a communications device (14), the system (2) carrying electrical energy in the form of a high voltage at a power frequency and communications signals at a frequency higher than the power frequency, composed of:

a capacitive power factor adjustment unit (4) connected to the distribution system (2) to correct for baseline loading and inherent reactance of the distribution system (2);

a blocking unit (6) connected between the adjustment unit (4) and ground, the blocking unit (6) having an impedance which varies directly with frequency such that the voltage across the blocking unit (6) at the power frequency has a value substantially less than the high voltage at the distribution system (2) and the communications signal voltage across the blocking unit (6) has a value only slightly less than at the distribution system; and a signal coupling unit (10,12) having a low impedance at the communications signal frequency and connected between the blocking unit (6) and the communications device (14) for conducting communications signals between the distribution system (2) and the device (14).

6 Claims, 1 Drawing Sheet

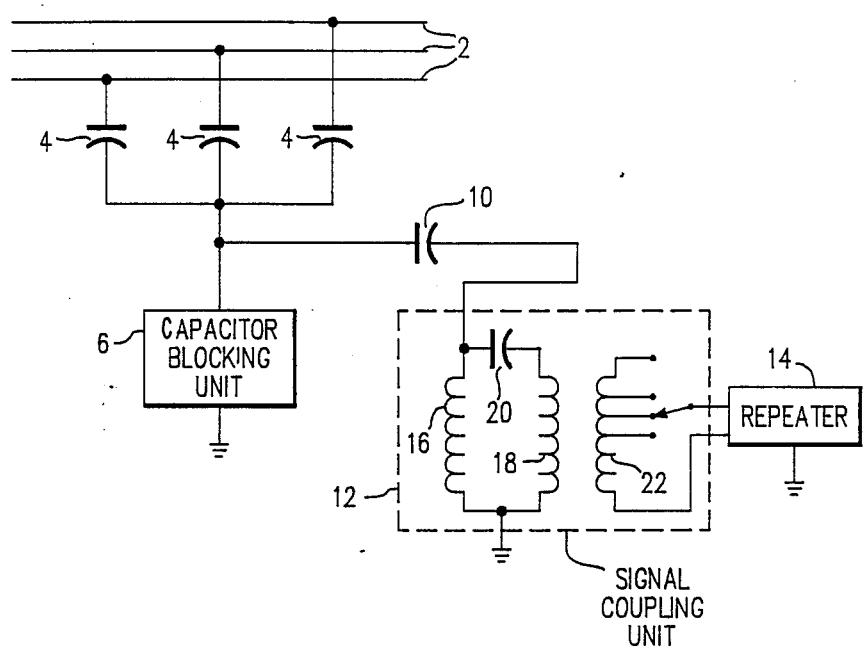

DISTRIBUTION OF LINE CARRIER COMMUNICATIONS

BACKGROUND OF THE INVENTION

The present invention relates to systems for use in distribution line carrier communications in which communication signals are transmitted over high voltage power transmission lines.

Communications transmissions of this type require repeaters disposed at spaced intervals along such high voltage power transmission lines. These repeaters must be connected to the transmission lines via couplings which have a low impedance at the communication signal carrier frequencies.

Coupling arrangements which have been proposed to date are all relatively expensive and complex.

SUMMARY OF THE INVENTION

It is a primary object of the invention to provide a simple and inexpensive arrangement for connecting components of such communications systems to high voltage power distribution lines.

BRIEF DESCRIPTION OF THE DRAWING

The sole FIGURE is a circuit diagram illustrating the coupling of a communications signal repeater to high voltage power distribution lines according to a preferred embodiment of the present invention.

DESCRIPTION OF THE PREFERRED EMBODIMENTS

The FIGURE shows three lines 2 of a high voltage power distribution path for tansmitting power at the conventional frequency of 60 Hz and communications signals which may, for example, be digital signals in the audio frequency range of 7-15 KHz. Lines 2 are connected to a fixed power factor capacitor bank composed of capacitors 4 connected in a wye configuration and having capacitance values selected, on the basis of principles known in the art, to account for the baseline loading and inherent reactance of the power distribution system. If the common connection point of capacitors 4 were directly connected to ground, the capacitors would present nearly a short circuit to ground with respect to audio frequency communications signals and would therefore significantly reduce the communications signal voltages at points along the distribution path downstream of the capacitor bank.

Such a result can be avoided by connecting a capacitor blocking unit 6, which is known per se, in series between the common connection point of capacitors 4 and ground. Units of this type are commercially available, such units being marketed, for example, by the Westinghouse Electric Corporation, under the designation 600 Series Capacitor Blocking Unit. Capacitor blocking unit 6 increases the impedance between the common connection point of capacitors 4 and ground with respect to audio frequency signals. A capacitor blocking unit 6 of the type identified above has an impedance characteristic which varies proportionally with frequency and which can maintain the 60 Hz voltage at the common connection point between capacitors 4 at a fixed value which is typically less than 50 volts RMS. Since, however, unit 6 offers a high impedance to higher frequency signals, only a negligible portion of the energy content of those signals will be dissipated in that unit.

According to the invention, the connection point between capacitors 4 and unit 6 is connected via a coupling capacitor 10 and a signal coupling unit 12 to a communication signal repeater 14 which functions, in a manner known in the art, to boost the level of any communications signal on lines 2.

Since the 60 Hz power voltage is maintained at a low level at the input side of capacitor 10, this capacitor need not be rated for the power voltage of the distribution lines. Coupling capacitor 10 could, by way of example, have a capacitance of the order of 1 μF.

Communications signals conducted via capacitor 10 are conducted to unit 12, where they are applied across a drain coil 16 and the primary 18 of a transformer, primary 18 being connected across coil 16 via a coupling capacitor 20 which provides additional 60 Hz isolation. The secondary 22 of the transformer is provided with a plurality of spaced taps and the terminals of repeater 14 are connected between one end of secondary 22 and a tap selected to provide a good impedance match between repeater 14 and unit 12 with respect to communications signals.

The signals arriving at repeater 14 are boosted in strength and returned, via the same path, to transmission lines 2.

Signal coupling unit 12 could be constituted by a commercially available device, such as a Model 821 Signal Coupling Unit marketed by the Westinghouse Electric Corporation. However, coil 16 can be selected to have a reduced current rating because of the presence of capacitor 10.

Repeater 14 could equally be a commercially available device such as an RPT 900 Series device marketed by the Westinghouse Electric Corporation.

Information for installing and adjusting capacitor blocking unit 6 is presented in a publication by the Westinghouse Electric Corporation entitled EMETCON (R) Line Equipment, Installation and Maintenance Technical Manual 42-6004A.

While the description above relates to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. Apparatus for coupling a high voltage power distribution system to a communications device, the system carrying electrical energy in the form of a high voltage at a power frequency and communications signals at a frequency higher than the power frequency, comprising:

capacitive power factor adjustment means connected to the distribution system to correct for baseline loading and inherent reactance of the distribution system;

blocking means connected between said adjustment means and ground, said blocking means having an impedance which varies directly with frequency such that the voltage across said blocking means at the power frequency has a value substantially less than the high voltage at the distribution system and the communications signal voltage across said blocking means has a value only slightly less than at the distribution system; and signal coupling means having a low impedance at the communications signal frequency and connected between said blocking means and said communications device for conducting communications signals between the distribution system and said device.

2. Apparatus as defined in claim 1 wherein said signal coupling means are connected to the point of connection between said blocking means and said adjustment means.

3. Apparatus as defined in claim 2 wherein said signal coupling means comprise a capacitor having a low impedance at the frequency of the communications signal.

4. Apparatus as defined in claim 3 wherein said signal coupling means further comprise a transformer having a primary winding connected to said capacitor and a secondary winding connected to said device.

5. Apparatus as defined in claim 1 wherein the system has a plurality of power conductors and said power factor adjustment means comprise a plurality of capacitors each connected between a respective conductor and said blocking means.

6. Apparatus as defined in claim 1 wherein said signal coupling means comprise a transformer having a primary connected across said blocking means and a secondary connected to said device.

* * * * *